Jan. 20, 1953  T. L. FAWICK  2,626,166
PLURAL-PASSAGE ROTARY FLUID SEAL
Filed March 21, 1950
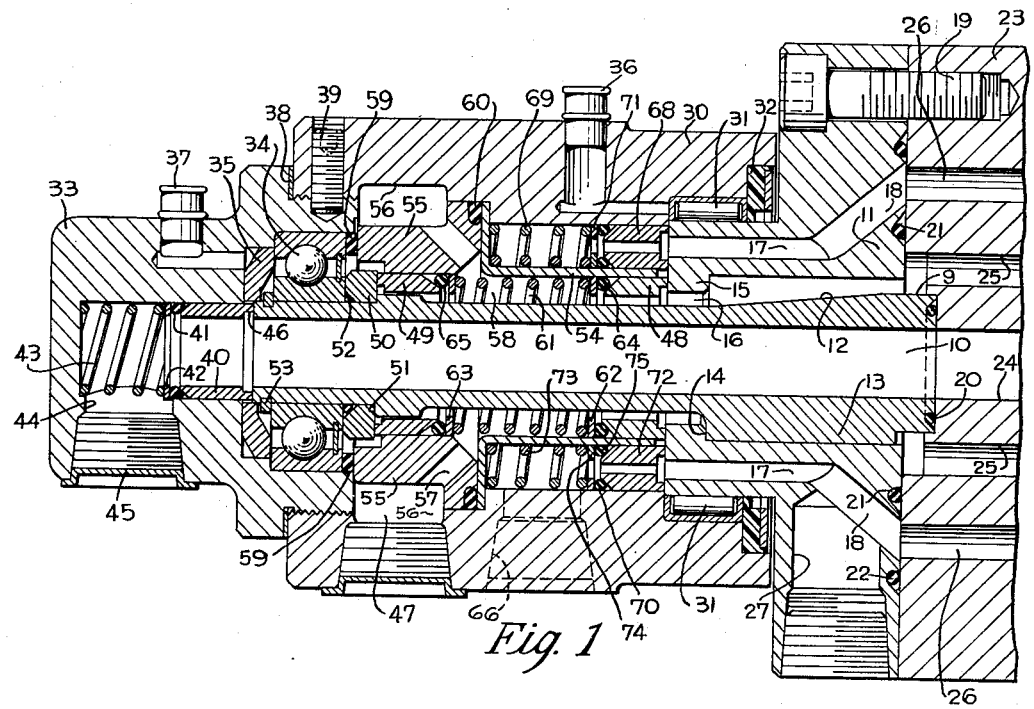
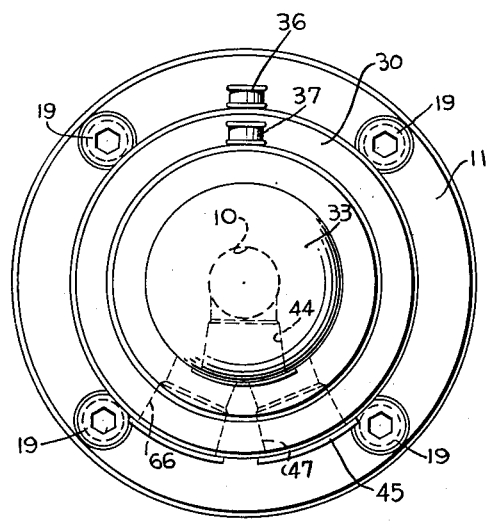
Fig. 2
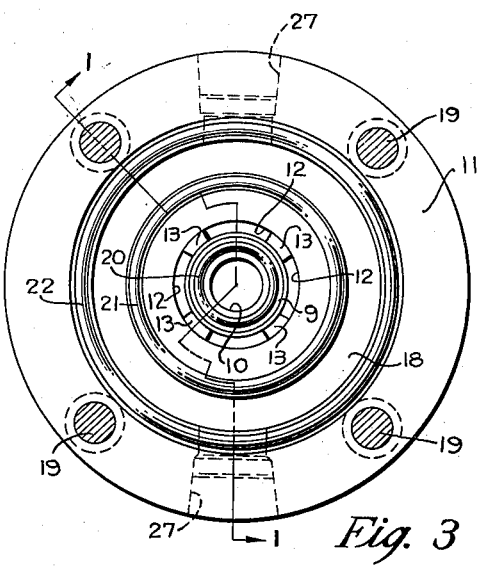
Fig. 3
INVENTOR.
Thomas L. Fawick
BY Willard D. Eakin
ATTORNEY Patented Jan. 20, 1953

2,626,166

UNITED STATES PATENT OFFICE 2,626,166

PLURAL-PASSAGE ROTARY FLUID SEAL

Thomas L. Fawick, Cleveland, Ohio, assignor to The Fawick Airflex Company, Inc., a corporation of Indiana Application March 21, 1950, Serial No. 150,983

2 Claims. (Cl. 285—22)

1

This invention relates to rotary fluid seals for conducting fluid from a non-rotary structure into and out of a plurality of passages in a rotary structure.

Its chief objects are to provide simplicity, compactness, effectiveness, durability, ease of assembly and disassembly and economy and facility of construction and repair in a seal of this kind, and especially a seal adapted for conducting fluid at respectively different pressures into or out of a plurality of passages in a rotating structure.

Of the accompanying drawings:

Fig. 1 is an axial section, on the indirect line 1—1 of Fig. 3, of a seal embodying my invention in its preferred form as applied to a three-passage assembly.

Fig. 2 is an end view of the same from the left of Fig. 1.

Fig. 3 is an end view of the same from the right of Fig. 1.

The seal comprises a nipple member 9, having a through aperture 10, and a collar member 11 adapted to be secured to the end face of a shaft 23 to rotate with the shaft.

The shaft-engaging end portion of the nipple member 9 is formed as a head which externally is shaped with a circumferentially spaced series of longitudinally extending through flow passage grooves 12, 12, Fig. 3, defined by intervening ribs 13, 13, which at their ends farthest from the shaft-engaging end of the nipple terminate in respective shoulders such as the shoulder 14, Fig. 1.

The collar member 11 has at that end an internal flange 15 of such internal diameter as to stand away from the nipple member to provide an annular flow passage 16 in communication with the spaced flow passages 12, 12 of the head of the nipple. From the flange 15 to its shaft-engaging end the collar member 11 is of such internal diameter as to fit snugly upon the outer faces of the nipple's ribs 13, 13, whose shoulder ends 14 are abutted as a stop by the collar member's flange 15.

The annular fluid passage 16 leads from a smooth plane end face of the collar member which is its slip-seal face and the collar member, farther out from the nipple, is formed with a circumferentially spaced set of passages 17, 17 leading from the said slip-seal face to a conical flow chamber 18 formed in the face of the shaft-engaging end of the collar.

The collar member is formed with suitable bolt holes and is thus adapted to be secured to the end face of the shaft 23 by means of bolts 19, 19, with the end of the nipple, projecting a little beyond the face of the collar, fitting in a suitable axial recess in the shaft, and sealed to the shaft by an O-seal ring 20 mounted in an annular groove in its end face and surrounding the mouth

2 of the through aperture 10 of the nipple, which is thus put in sealed communication with an axial hole 24 in the shaft, the ring 20 also sealing off the nipple's interior from its external flow passages 12, 12.

The shaft is formed with a hole or holes 25, 25 registering with the set of passages 12, 12 of the nipple and with a hole or holes 26, 26 registering with the conical flow chamber 18.

Radially inward from the annular mouth of the conical chamber 18 an O-seal ring 21 is mounted in a groove in the face of the collar and is adapted, sealing against the shaft, to seal off the passages 12, 12 from the chamber 18. Likewise an O-seal ring 22 surrounds the mouth of the chamber 18 for completing the seals of the three-channel communication of the rotor assembly, 9, 11, with the respective passages in the shaft or other member with which it rotates.

In the particular embodiment here shown the collar member 11 of the rotor is formed with one or more socketed passages 27, 27 leading from its side face to the conical flow passage 18, for use on occasion. In the present drawing they are shown as being plugged. When they are used and the shaft's holes 26, 26 omitted the O-seal rings 21, 22, against the shaft, seal off the large end of the chamber 18.

For slip-seal coaction with the rotor 9, 11, a stator comprises a casing 30 having a roller bearing 31 and an oil-retaining and dust-excluding ring 32 mounted between it and the collar member 11 of the rotor. The stator comprises also an end closure member 33 screwed into the outer end of the member 30 and having a ball bearing 34 and a porous oil-retaining and distributing ring 35 mounted between it and the outer end portion of the nipple member 9 of the rotor.

The stator members 30, 33 are suitably channeled and provided with respective oil fittings 36, 37 for lubrication of the bearings 31 and 34.

After assembly with other parts, some of which are still to be described, the stator casing members 30 and 33, screwed together to proper indexed relation, with a compressible gasket 38 between them, and are secured in that relationship by means of a set-screw 39.

The stator member 33 is formed with a cylindrical socket for a through-apertured slip-seal member 40, preferably of a suitable carbon composition, having slip-seal coaction with the polished annular end face of the nipple 9. The end of the member 40 farthest from the nipple is externally beveled for wedging coaction with an O-seal ring 41 of oil-resistant synthetic rubber which is pressed in sealing engagement with the bevel and with the cylindrical wall of the socket by a metal washer 42 backed by a helical compression spring 43 which seats against the end wall of the socket.

Extending laterally from the socket to the side face of the stator member 33 is a passage 44 threaded for the reception of a hose nipple. It is here shown as being temporarily closed by a plug or plate 45, for exclusion of dirt during storage and shipment of the seal.

The assembly of parts just described is such that slip-seal closed communication is provided from the passage 44, through the members 40 and 9, to the central hole 24 in the shaft. By reason of the taper of the outer end of the slip-seal member 40 and the force of the spring 43 against the O-seal ring 41 seated upon the taper, the seal is maintained not only when fluid at super-atmospheric pressure is conducted through the passage 44 into the passage 10 of the nipple, but also when suction is applied to these passages, as for effecting quick release of a pneumatic clutch, for example.

The construction is such that pressure of fluid augments the force of the spring in maintaining sealing pressure between the slip-seal member 40 and the end of the nipple. To avoid an excess of such pressure, and also to provide a desirably small slip-seal area, with adequate thickness of the main body wall of the member 40, its end portion adjacent the nipple preferably is of internally rabbeted form, as shown at 46.

To provide similar slip-seal closed communication between a passage 47, extending from a side face of the stator member 30 to the interior of the latter, and the annular passage 16 between the nipple 9 and the annular flange 15 of the collar member 11, a slip-seal ring 48 coacts with the slip-seal end face of the collar member 11, in an area surrounding the annular passage 16, and a slip-seal ring 49 coacts with a smooth-faced metal ring 50 which is gripped between a shoulder 51 on the nipple 9 and the inner race of the ball-bearing 34 and sealed to the latter and to the nipple 9 by an O-seal ring 52.

A snap ring 53 seated in the outer face of the nipple 9 holds the bearing race against the ring 50 and in so doing positions and retains the stator upon the rotor.

The cylindrical socket for the slip-seal ring 48 is provided by a sheet-metal member 54 and that for the slip-seal ring 49 is provided by a metal ring 55, the outer face of which, with the casing member 30, defines an annular flow chamber 56 which is in communication with the supply passage 47, and, through oblique holes 57, 57 in the ring 55, is in communication with a chamber 58 of which the annular members 54 and 55 are the outer wall and the nipple 9 is the inner wall.

A compressible gasket 59 seals the ring 55 to the outer race of the bearing 34 and to the closure cup 33 of the stator and a similar gasket 60 seals the ring 55 to an end flange of the member 54 and to the casing member 30 of the stator. These two gaskets are held under compression primarily by the screwing up of the closure cup 33 in the stator casing 30.

The slip-seal rings 48 and 49 are held under sealing pressure against the slip-seal faces of the members 11 and 50 respectively by a helical compression spring 61 interposed between metal washers 62, 63 bearing against respective O-seal rings 64, 65 seated upon tapered ends of the respective slip-seal rings and sealing against them and against the inner faces of the members 54 and 55 respectively.

To provide slip-seal closed communication between a supply passage 66, extending from a side face of the stator casing 30 to its interior, and the holes 17 in the collar member 11 of the rotor, the outer face of the member 54 and the inner face of the casing define an annular chamber open to the said supply passage 66 and to the said holes 17, and a slip-seal ring 68, slidably mounted in the casing member, seals against the slip-seal face of the rotor member 11, in an area surrounding the set of holes 17, and is held in sealing pressure against it by a helical compression spring 69 seated against the end flange of the member 54 and, through a metal washer 70, pressing an O-seal ring 71 against the tapered end of the slip-seal ring and against the cylindrical inner face of the casing member 30.

In order to permit the use of widely different fluid pressures in the annular passage 16 and in the holes 17 without an excessive differential of pressures inside and outside of the slip-seal face of the slip-seal ring 48 between them, and to permit the simultaneous use of suction in both channels, it is desirable to provide a slip-seal ring 72 surrounding the ring 48 and the member 54 and sealing against the rotor member 11 in an annular area between the ring 48 and the holes 17, the ring 72 thus providing a slip-seal independent of and additional to that of the ring 48.

The rings 71 and 72 define an annular passage between them and the ring 72 is backed by its own spring 73, washer 74 and O-seal ring 75, which seals it to the outer face of the member 54.

It is believed that the mode of operation of the seal is adequately presented in the foregoing description and that the attainment of the above stated objects will be manifest.

I claim:

1. A rotary seal comprising two relatively rotary members each formed with at least three fluid passages and means for maintaining sealed communication between the fluid passages of one of the members with respective fluid passages of the other of said members and thus maintaining respective flow channels, said means comprising, as to one of the said flow channels, a pair of oppositely, axially facing slip-seal rings on one of said members and having slip-seal relation to the other of said members, and, as to another of said flow channels, two slip-seal rings radially spaced from each other, facing in the same direction, and defining between them an annular flow chamber constituting a part of the last mentioned flow channel.

2. A seal as defined in claim 1 in which the two slip-seal rings defining the recited flow chamber have their slip-seal faces in the same plane.

THOMAS L. FAWICK.

REFERENCES CITED

The following references are of record in the file of this patent:

UNITED STATES PATENTS

| Number | Name | Date |
| --- | --- | --- |
| 872,358 | Liddell | Dec. 3, 1907 |
| 2,384,281 | Carter | Sept. 4, 1945 |
| 2,404,494 | Halby et al | July 23, 1946 |
| 2,462,006 | Schmitter | Feb. 15, 1949 |